United States Patent
Gaspar et al.

(10) Patent No.: US 6,834,313 B1
(45) Date of Patent: Dec. 21, 2004

(54) PERFORMING A TWO-STEP READ ON A MAC REGISTER IN A HOME NETWORK AS AN ATOMIC READ

(75) Inventors: Harand Gaspar, Cupertino, CA (US); Peter K. Chow, San Jose, CA (US); Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 756 days.

(21) Appl. No.: 09/884,617

(22) Filed: Jun. 19, 2001

(51) Int. Cl.[7] ............................................. G06F 13/00
(52) U.S. Cl. ..................... 709/250; 709/253; 710/131
(58) Field of Search .............................. 709/249, 250, 709/251, 252, 253; 710/129, 131

(56) References Cited

U.S. PATENT DOCUMENTS 5,561,821 A * 10/1996 Gephardt et al. ............. 710/28
5,812,813 A * 9/1998 Henry et al. ................. 712/218
6,768,720 B1 * 7/2004 Kamstra et al. ............. 370/245
6,785,720 B1 * 8/2004 Seong ......................... 709/220

* cited by examiner

*Primary Examiner*—Viet D. Vu
(74) *Attorney, Agent, or Firm*—Winstead Sechrest & Minick P.C.

(57) ABSTRACT

A method and system for performing a two-step read on a count register as an atomic read in a home network is disclosed. The count register has a lower half and an upper half, and is incremented in response to an increment signal and is read in response to a read signal. The method and system include reading the lower half of the count register and storing the upper half of the count register in a shadow register in response to detecting the increment signal. The shadow register is then read in order to obtain the value of the upper half of the count register, thereby avoiding reading an incorrect result from the register.

15 Claims, 3 Drawing Sheets

PERFORMING A TWO-STEP READ ON A MAC REGISTER IN A HOME NETWORK AS AN ATOMIC READ

FIELD OF THE INVENTION

The present invention relates to home networks, and more particularly to a method and system for performing a two-step read as an atomic read in a home network.

BACKGROUND OF THE INVENTION

HomePNA or HPNA is a de facto home networking standard developed by the Home Phoneline Networking Alliance. HPNA allows all the components of a home network to interact over the home's existing telephone wiring without disrupting voice capability. In the same way a LAN operates, home networking processes, manages, transports and stores information, which enables disparate devices in a home network such as telephones, fax machines, desktops, laptops, printers, scanners and Web cameras to connect and integrate over an existing wiring topology.

To create the home network, personal computers may be equipped with a HPNA network and HPNA software. An HPNA network may be implemented as an internal PC network interface card (NICs) that includes telephone jacks on the back for connection to the network. An HPNA network may also be implemented as a chipset or as an external USB adapter that plugs into the USB port on the PC on one end, while the other end connects to the phone line at the wall jack.

FIG. 1 illustrates an embodiment of a home phone line network that complies with the Home Phoneline Networking Alliance (HPNA) specification version 2.0. The network allows multiple computers to communicate through telephone wires of residential homes. The network includes an application program running on the PC called a host media access controler (MAC) 112, and a control chip 100 for implementing the HPNA 2.0 specification, which is included on a network interface card. The control chip 100 includes a Media Independent Interface (MII) 106, a Media Access Controller (MAC) 108, and a Physical Layer (PHY) 110. The MAC 108 includes several 32-bit registers for maintaining statistics regarding frame transmission and reception on the home network. These registers are accessible by the host MAC 112 so that a user may monitor and diagnose the system. The MII 106 receives the request from the host MAC 112 to read the MAC registers by issuing a read request signal. The MII 106 also includes its own internal registers that are 16 bits in length, which dictates that the MII 106 is only capable of reading 16 bits at a time.

Therefore, when the MII 106 needs to read one of the 32-bit MAC registers, a two-step read operation is necessary in which the MII 106 reads the lower half of the register first followed by the upper half of the register. The problem is that the MAC registers are updated by an increment signal that increments the value in the registers. Periodically, the increment signal and the read signal from the MII 106 occur simultaneously. The result is that when the MII 106 performs its two-step read and reads the lower half of the register in the first step, the lower half of the register may get incremented and overflow into the upper half of the register before the upper half is read. This will result in an incorrect value being read from the register.

Accordingly, what is needed is a method and system for performing a two-step read on the MAC registers as if one atomic read had been performed so that the correct value is always read from the registers. The present invention addresses such a need.

SUMMARY OF THE INVENTION

The present invention provides a method and system for performing a two-step read on a count register as an atomic read in a home network. The count register has a lower half and an upper half, and is incremented in response to an increment signal and is read in response to a read signal. The method and system include reading the lower half of the count register and storing the upper half of the count register in a shadow register in response to detecting the increment signal. The shadow register is then read in order to obtain the value of the upper half of the count register.

According to the system and method disclosed herein, the present invention assures that reading an incorrect value from the upper half of the count register due to any overflow condition is avoided.

DETAILED DESCRIPTION

The present invention relates to reading registers in two steps without error in a home network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
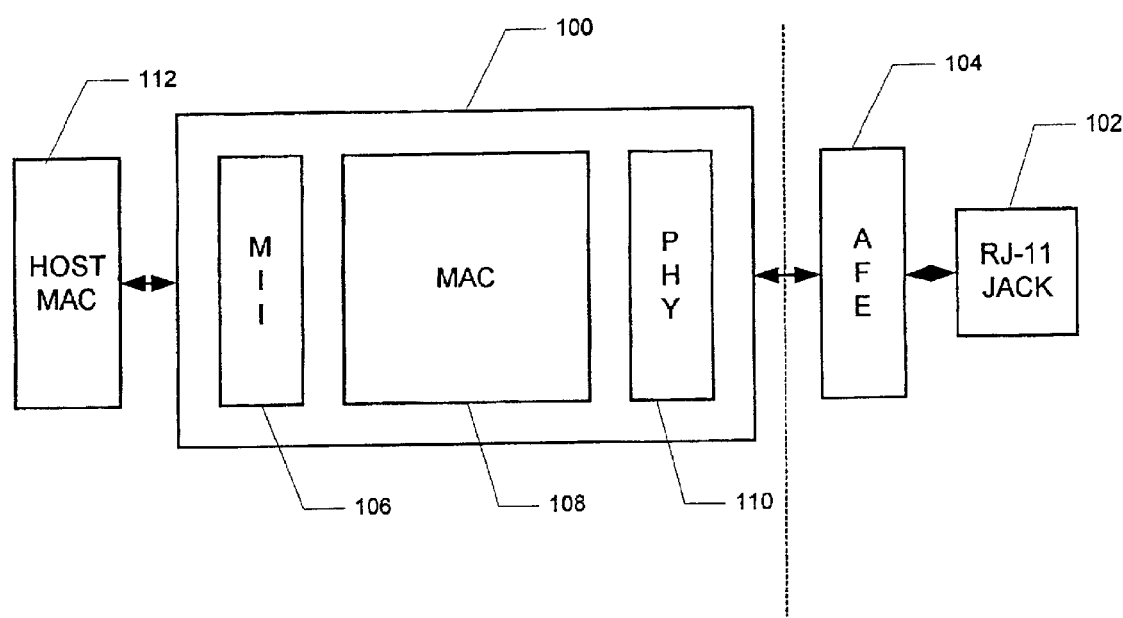
FIG. 1 illustrates an embodiment of a home phone line network that complies with the Home Phoneline Networking Alliance (HPNA) specification version 2.0.
Figure 2:
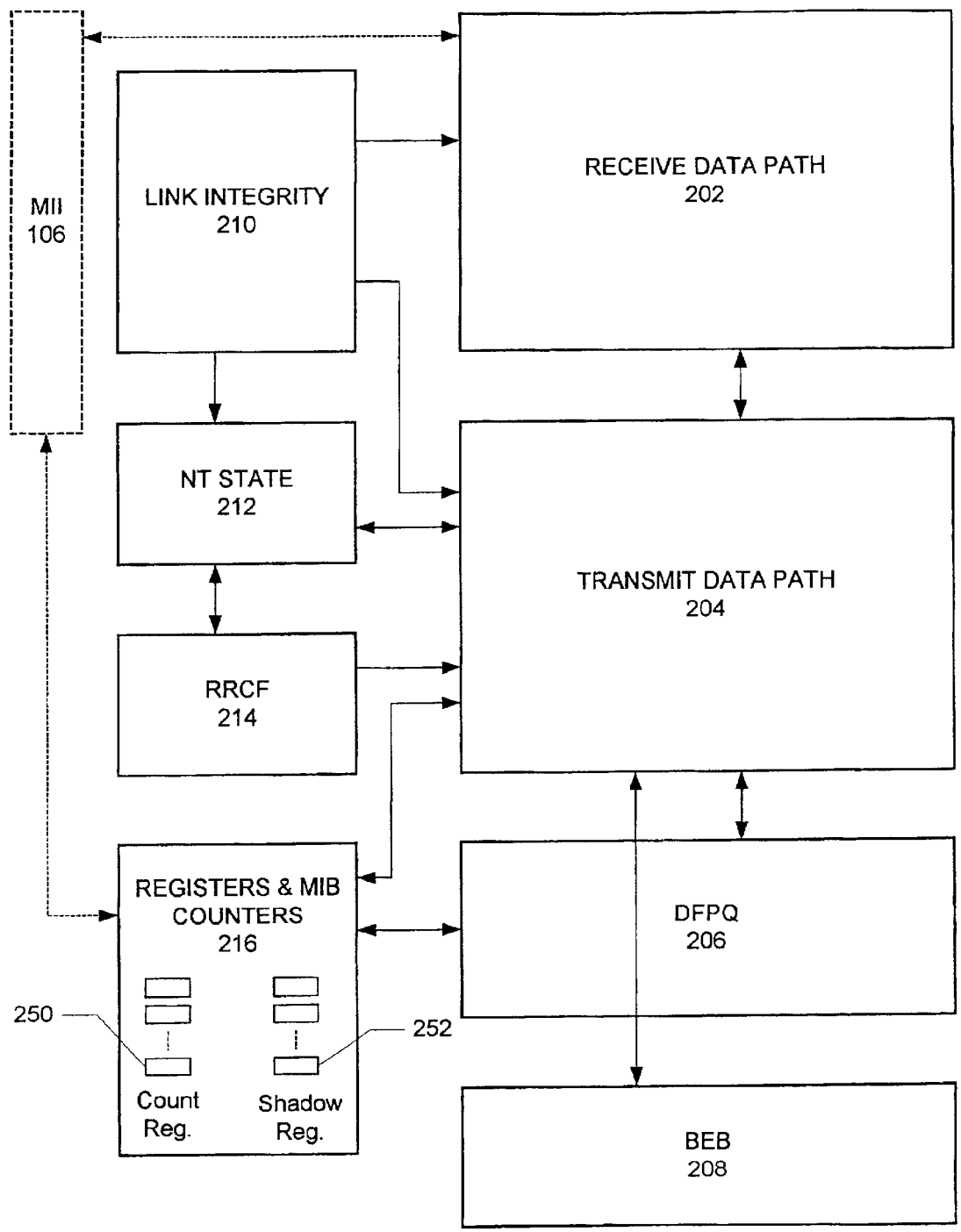
FIG. 2 illustrates a preferred embodiment of the MAC in accordance with the present invention.

FIG. 2 illustrates a preferred embodiment of the MAC 108 in accordance with the present invention. The MAC 108 comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, a plurality of registers and Management Information Base (MIB) counters 216.

The Receive Data Path 202 receives data packets from the PHY 110 and sends data packets to the MII 106. In the preferred embodiment, after the Receive Data Path 202 sends each data packet to the MII 106, another packet, referred to as a "frame status frame", is sent immediately following. The frame status frame contains certain status information required by subsequent processes. The Transmit Data Path 204, receives frames of data packets from the MII 106 and transmits them to the PHY 110.

The Link Integrity 210 monitors the physical network conditions. In the preferred embodiment, the Link Integrity 210 updates a link status bit in a link register. The Link Integrity 210 also sends link packets in accordance with the HPNA 2.0 specification.

The Network State 212 monitors the current mode of the MAC 108, i.e., whether the MAC 108 is operating in the 10 mpbs data rate mode ("10M8") or the 1 mpbs data rate mode ("1 M8"). The RRCF 214 sends a RRCF whenever the MAC 108 transitions between data rates. The RRCF is used to perform the rate negotiation function, i.e., to determine what is the data rate to communicate between different stations in a home phone line network.

The DFPQ 206 and the BEB 208 provide collision resolution for the MAC 108. The DFPQ 206 provides collision resolution for the 10 mpbs data rate, while the BEB 208 provides collision resolution for the 1 mpbs data rate. In the preferred embodiment, the PHY 110 will provide a collision detect signal, and either the DFPQ 206 or the BEB 208 will then attempt to resolve the collision depending on the operating mode.

The registers and MIB counters 216 provides programmability to the MAC 108 and handles error event counting. In a preferred embodiment, the registers and MIB counters 216 include eighteen count registers 250 for maintaining transmission and reception statistics. For example, the count registers 250 may be used to count the number and type of frame collisions, the number of error frames detected, the number of unsupported frames detected, the number of missed frames detected, and so on.

Each of the count registers 250 include a lower half and an upper half. In a preferred embodiment, the count registers 250 are 32-bits in length, and each half of the count registers 250 are 16-bits.

The count registers 250 are incremented in response to increment signals, which are activated by various components of the control chip 100. The count registers 250 are read by the host MAC 112 for diagnostic purposes. The MII 106 initiates a read operation for the host MAC 112 by issuing a read request signal to the registers and MIB counters 216.

There are problems associated with reading the count registers 250. One problem is that an increment signal and a read request signal may occur for a particular count register 250 at the same time, causing a conflict. In addition, because the MII 106 requires a two-step read to read the count registers 250, when an increment signal and a read request signal from the MII 106 for a particular register occur simultaneously, the lower half of the register may get incremented and overflow into the upper half of the register before the second step of the two-step read is initiated. This will result in an incorrect value being read from the upper half of the register.

The present invention provides a method and system for performing the two-step read on the count registers 250 as if one atomic read had been performed so that the correct value is always read from the count registers 250. According to the present invention, the registers and MIIB counters 216 are provided with a plurality of shadow registers 252 corresponding to each of the count registers 250. The shadow registers 252 are used for saving the value of upper half of the counter registers 250 before the upper half is corrupted by an overflow from the lower half during simultaneous increment and read operations, as explained below.

Figure 3:
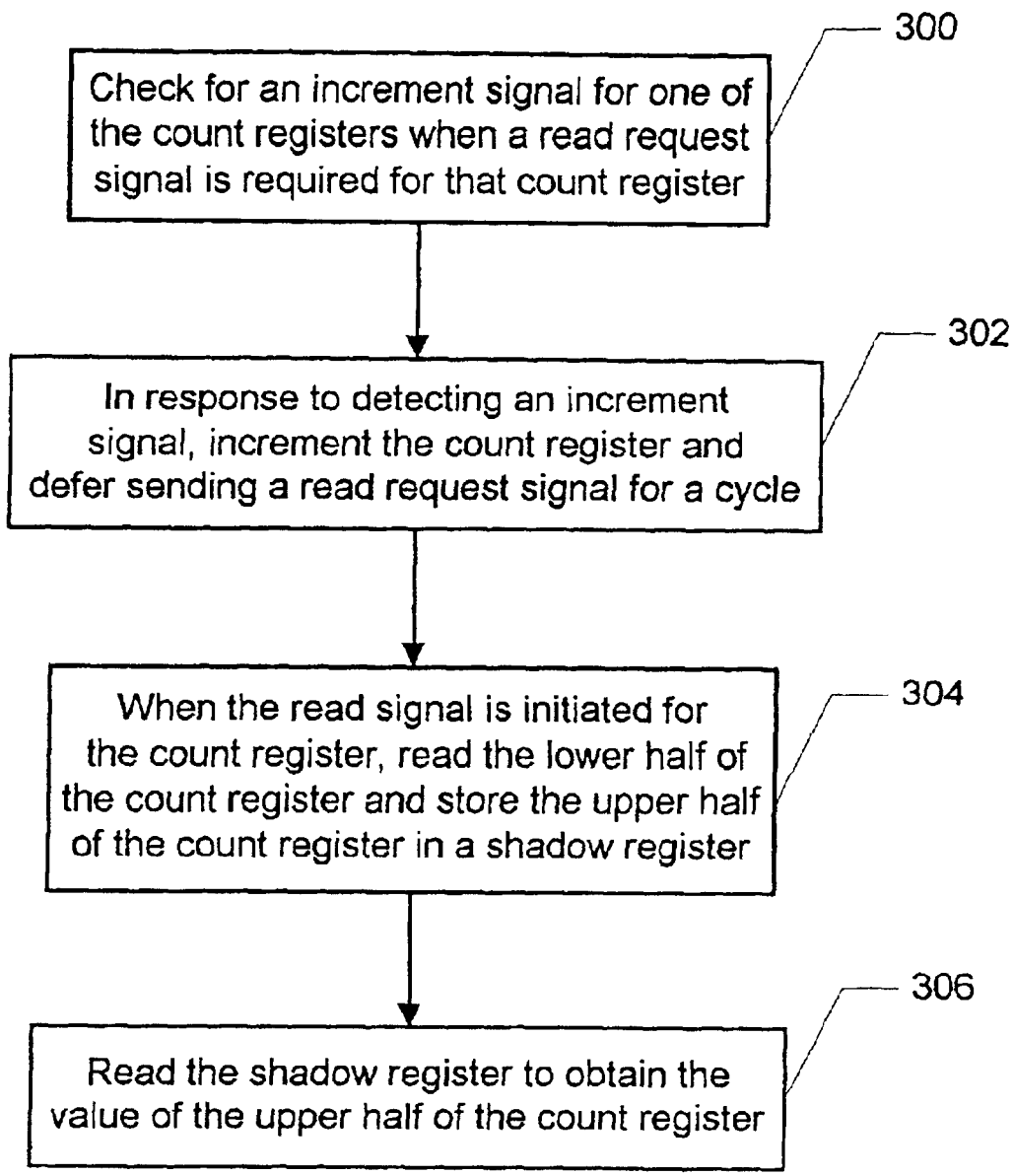
FIG. 3 is a flow chart illustrating a process for performing a two-step read on a count register as an atomic read in accordance with the preferred embodiment of the present invention.

FIG. 3 is a flow chart illustrating a process for performing a two-step read on a count register 250 as an atomic read in accordance with the preferred embodiment of the present invention. The process begins by checking for an increment signal for one of the count registers 250 when a read request signal is required for that count register 250 in step 300. In response to detecting an increment signal, the count register 250 is incremented and the MII 106: defers sending a read request signal for a cycle in step 302.

When the read signal is initiated for the count register 250, the lower half of the count register 250 is read and the upper half of the count register 250 is stored in a shadow register 252 in step 304. Thereafter, the shadow register 252 is read to obtain the value of the upper half of the count register 250 in step 306.

According to the present invention, if the increment signal causes the lower half of the count register 250 to overflow into the upper half, the original contents of the upper half are stored in the shadow register 252 and thus protected from the overflow condition. Even if the reading of upper half of the count register 250 occurs after the overflow condition, the value of the shadow register 252 reflects the original value of the upper half of the count register 250 before the overflow. Therefore, the two-step read process of the present invention will always yield the correct result and appear as if one atomic read was performed on the count register 250.

A method and system for performing a two-step read as an atomic read in a home network has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for performing a two-step read on a register as an atomic read in a home network, the register having a lower half and an upper half, and is incremented in response to an increment signal and is read in response to a read signal, the method comprising the steps of:

(a) in response to detecting the increment signal, reading the lower half of the register and storing the upper half of the register in a shadow register; and (b) reading the shadow register to obtain the value of the upper half of the register.

2. The method of claim 1 wherein step (a) further includes the step of: checking for the increment signal when a read request signal is required for the register.

3. The method of claim 2 wherein step (b) further includes the step of: reading the lower half of the register when the read signal is initiated for the register.

4. The method of claim 3 further including the step of providing the register as a count register for maintaining statistics on the home network.

5. The method of claim 4 further including the step of providing the home network with a plurality of count registers.

6. The method of claim 5 further including the step of providing the count registers as 32-bit registers with 16-bit the upper and lower halves.

7. A home network that performs a two-step read on a register as an atomic read, wherein the register has a lower half and an upper half, and is incremented in response to an increment signal and is read in response to a read signal, the home network comprising:

means responsive to detecting the increment signal for reading the lower half of the register and storing the upper half of the register in a shadow register; and means for reading the shadow register to obtain the value of the upper half of the register.

8. The home network of claim 7 wherein the means responsive to detecting the increment signal further includes means for checking for the increment signal when a read request signal is required for the register.

9. The home network of claim 8 wherein the lower half of the register is read when the read signal is initiated for the register.

10. The home network of claim 9 wherein the register comprises a count register for maintaining statistics on the home network.

11. The home network of claim 10 wherein a plurality of count registers are present.

12. The home network of claim 11 wherein the count registers comprise 32-bit registers with 16-bit the upper and lower halves.

13. A method for performing a two-step read on a count register as an atomic read in a home network, the method comprising the steps of:
   (a) providing a plurality of count registers, each having a lower half and an upper half, and each being incremented in response to increment signal and read in response to a read signal;
   (b) checking for the increment signal for one of the count registers when a read request signal is required for that count register;
   (c) in response to detecting the increment signal, incrementing the count register and deferring sending the read request signal for a cycle;
   (d) when the read signal is initiated for the count register, reading the lower half of the count register and storing the upper half of the count register in a shadow register; and
   (e) reading the shadow register to obtain the value of the upper half of the count register.

14. The method of claim 13 further including the step of providing the count registers as 32-bit registers with 16-bit the upper and lower halves.

15. A home network comprising;
   a control chip for implementing a home phoneline network alliance specification, the control chip including,
      a media access controller (MAC), the MAC further including,
      at least one shadow register;
      a plurality of count registers for maintaining network statistics, each of the count registers including an upper and lower half, and incremented in response to an increment signal; and
   a host media access controller program in communication with the MAC for accessing the count registers, wherein the MAC sends a read request signal for the particular count register being read, and wherein before sending the read request signal for the count register,
      the MAC checks for the increment signal for the count registers, and in response to detecting the increment signal, the count register is incremented and the MAC defers sending the read request signal for a cycle,
      when the MAC sends the read signal for the count register, the lower half of the count register is read and the upper half of the count register is stored in the shadow register, and
      the shadow register is to obtain the value of the upper half of the count register.

* * * * *